United States Patent [19]

Hall

[11] Patent Number: 5,678,474

[45] Date of Patent: Oct. 21, 1997

[54] APPARATUS FOR MAKING AND COOKING MEATBALLS

[76] Inventor: Pauletta A. Hall, 25595 Statler, Taylor, Mich. 48180

[21] Appl. No.: 774,495

[22] Filed: Dec. 30, 1996

[51] Int. Cl.⁶ .......................... A47J 27/00; A47J 43/18; A23P 1/00; A22C 7/00
[52] U.S. Cl. .......................... 99/353; 99/440; 99/448; 425/279; 425/333; 425/377; 425/572
[58] Field of Search .......................... 99/352–355, 339, 99/340, 440, 426, 441, 448, 423; 220/486, 508; 249/102, 120, 126, 139; 425/572–576, 256, 812, 333, 352, 408, 377, 382, 444, 464, 279, 382.3; 426/513, 516

[56] References Cited

U.S. PATENT DOCUMENTS

| | | | |
|---|---|---|---|
| 2,402,883 | 6/1946 | Gavalis | 99/440 |
| 3,691,594 | 9/1972 | Klein | 425/572 |
| 3,713,187 | 1/1973 | Quartarone et al. | 425/333 X |
| 3,797,069 | 3/1974 | Von Lersner et al. | 425/377 |
| 3,991,665 | 11/1976 | Lang-Ree et al. | 99/440 X |
| 4,073,225 | 2/1978 | Lang-Ree | 99/339 |
| 4,150,459 | 4/1979 | Siclari | 425/279 |
| 4,187,582 | 2/1980 | DiLoreto | 425/377 |
| 4,257,145 | 3/1981 | Bovino | 425/574 X |
| 4,712,272 | 12/1987 | Soodalter | 425/377 |
| 4,862,793 | 9/1989 | Steiner | 99/440 X |
| 4,908,487 | 3/1990 | Sarnoff et al. | 99/448 X |
| 5,494,253 | 2/1996 | Snow | 99/440 X |

*Primary Examiner*—Timothy F. Simone
*Attorney, Agent, or Firm*—Patent & Trademark Services, Inc.; Joseph H. McGlynn

[57] ABSTRACT

An apparatus for preparing meatballs which comprises a meatball forming device and a meatball cooking device. The meatball forming device comprises a housing, which has a top opening communicating with a lower output tube. Between the top opening and the output is a mechanism having planar belts entrained around two pairs of rollers, said belts being opposably rotated by turning a crank handle on a single roller. The faces of the belts contact one another, and each face has matching, aligned semi-spherical indentions. Ground meat is pushed into the top opening, and the roller crank is turned to opposably rotate the belts. Meat is squeezed into the spherical space between the belts and communicated through the output. The meatball cooking device comprises several cooking trays with indentions for receiving a number of meatballs. The cooking trays are detachably connected to supporting members and may be stacked on top of one another in superimposed fashion.

5 Claims, 1 Drawing Sheet

APPARATUS FOR MAKING AND COOKING MEATBALLS

BACKGROUND OF THE INVENTION

The present invention relates generally to cooking wares, and in particular to an improved kitchen apparatus for making and cooking meatballs and similar foods.

DESCRIPTION OF THE PRIOR ART

Foods such as eggs, cookies, biscuits, and meatballs are often cooked in large numbers, and a variety of devices which expedite the cooking of these foods are known. The prior art has disclosed a plethora of trays, cookers, and other devices which aid the user in cooking batches of items. As described below, however, there remains a need in the art for an apparatus which expedites the making and cooking of meatballs and other foods that must be formed and cooked in batches.

U.S. Pat. No. 2,402,883 describes a rack for cooking several eggs, having inner and outer rings, with egg receiving crates disposed between the rings. This invention does not have a means to prepare meatballs, and its webbed, egg receiving crates are not suitable for holding ground meat.

U.S. Pat. No. 5,494,253 discloses a cookie rack, having multiple stacked sheets with openings for receiving cookie molds. This invention cannot be used to shape meatballs from ground meat. It is also cumbersome for cooking purposes, having a multitude of separate molds which are time consuming to remove and clean.

U.S. Pat. Nos. 4,073,225 and 4,103,605 describe meatball cooking devices. These inventions are complex and expensive, and are far too cumbersome to be used outside the commercial arena. Moreover, these inventions do not provide a means to form meatballs from ground meat, requiring the user to form the meatballs separately before they can be introduced into the cooker.

There remains a need in the art for an apparatus which is capable of forming and cooking a plurality of meatballs and similar foods. Additionally, there remains a need for a meatball preparing apparatus which is inexpensive, easy to clean, and suitable for use in private homes. The present invention, described in detail below, provides a device which expedites the preparation of meatballs and similar foods, having certain aspects which overcome the drawbacks of the prior art and which provide advantages not afforded by the inventions heretofore disclosed.

SUMMARY OF THE INVENTION

The present invention is a meatball preparing apparatus which enables the user to form a plurality of meatballs quickly and easily, and also, to cook a multitude of meatballs efficiently. While its contemplated use is primarily that of preparing meatballs, however, it should be understood that the invention could also be used to prepare other foods, such as biscuits or cookies, which are formed from malleable material and cooked in batches.

In one aspect of the invention, there is provided a device for forming a plurality of meatballs from ground meat. This device comprises a housing with a top opening and a lower outlet tube, the top opening and outlet tube being in communication. Disposed between the top opening and the outlet is a manually operated, meatball forming mechanism. The meatball forming mechanism includes a pair of planar belts which are entrained around four cylindrical rollers. Rollers project horizontally through the center of the housing, and are rotatably mounted therein. The rollers are positioned such that the opposing surfaces of the two belts contact one another. Each belt further has a plurality of matching, semi-spherical indentations disposed on the surface thereof. At least one roller is provided with a hand crank. The rollers and belts have corresponding toothed projections and indentations, such that turning the crank results opposing rotation of both belts. The semi-spherical indentations are correspondingly aligned on the belts, such that they come together and form spherical spaces when the crank is turned. To use the meatball forming device, ground meat is pushed into the top opening of the housing while the crank is simultaneously turned. The meat is squeezed into the spherical spaces formed by the alignment of the opposing indentations, forming spherical meatballs which are communicated through the outlet tube.

In another aspect of the invention, there is provided an improved device for cooking a plurality of meatballs. This device comprises a number of trays having multiple indentations for receiving meatballs. A number of supporting members are also provided, having means to hold several trays at varying heights. The trays are stacked on top of one another in superimposed fashion on the support members. The cooking device may be filled with meatballs and placed in a conventional oven, a slow cooker, or a microwave oven.

Accordingly, it is an object of this invention to provide an improved preparation device for meatballs and similar foods.

It is also an object of this invention to provide a meatball preparation device which is inexpensive, convenient, and easy to clean.

It is still further an object of this invention to provide a meatball preparation device which is capable of forming a plurality of meatballs from ground meat.

It is still further an object of this invention to provide a meatball preparation device which can be used to cook a multitude of meatballs in various types of cooking ovens.

These and other objects and advantages of the present invention will become readily apparent from the detailed description below, when taken in conjunction with the annexed drawings.

DESCRIPTION OF THE PREFERRED EMBODIMENT

Figure 1:
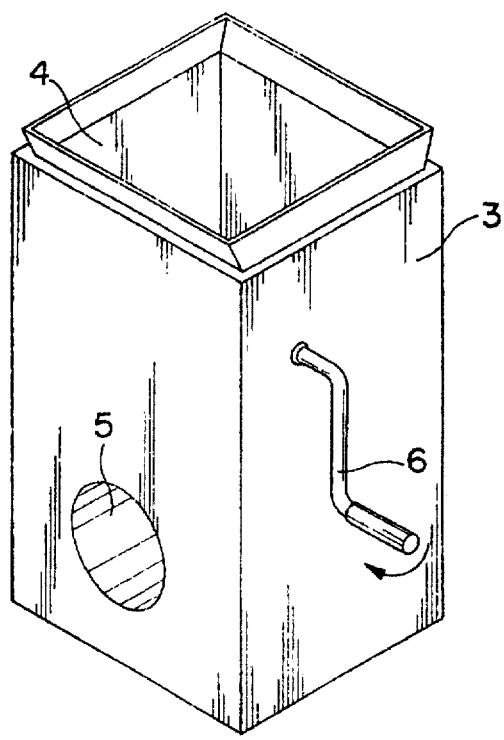
FIG. 1 shows a perspective view of the meatball forming device of the present invention.

Referring now to the drawings in greater detail, it can be seen in FIG. 1 that the meatball forming device 2 of the present invention comprises a housing 3 with a top opening 4 and an output tube 5. The top opening 4 is in communication with the output tube 5. The housing 3 can be constructed from hard plastic, anodized aluminum, or any other sturdy, non-corrosive material. Also shown in FIG. 1 is a laterally extending crank handle 6, which is used to operate the meatball forming device 2 in the manner described below.

Figure 2:
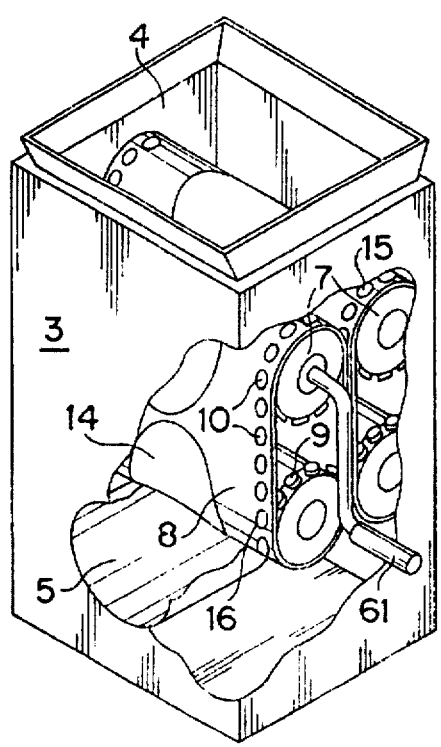
FIG. 2 shows a view of the meatball forming device similar to that shown in FIG. 1, with parts cut away to show the internal mechanism of the device.
Figure 4:
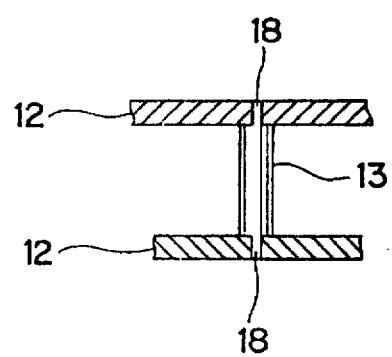
FIG. 4 shows a partial view of two trays with one of the supports for the trays.

As shown in FIG. 2, depicting the mechanism of the meatball forming device 2, the crank handle 6 is attached to one of four cylindrical rollers 7, which project horizontally through the housing 2 at points between the top opening 4 and the output tube 5. The rollers 7 are rotatably mounted at either side of the housing 2. Entrained vertically about each pair of rollers 7 are two planar belts 8, which have opposing outer surfaces in contact with one another. The belts 8 can be constructed from thick, non-stick silicone rubber or some other suitable material. The belts 8 have a plurality of identical, semi-spherical indentions 14 on the surfaces thereof, which form spherical spaces between the outer surfaces of the belts 8 when the indentions 14 are aligned.

Disposed on the edges of the rollers 7 are radially extending, toothed projections 9, which are received into corresponding apertures 10 on the surfaces of the belts 8. Thus, it can be appreciated that when the crank handle 6 is turned, the upper drum 7 (see FIG. 2) will rotate. As this drum rotates, the teeth 9 will engage the apertures 10 which will rotate the belt 8, which in turn rotates the lower drum 7. Since the belts 8, are in surface to surface contact, friction between the belts will rotate the belt 8 (on the right side of FIG. 2) in the opposite direction.

The operation of the meatball forming device 2 will now be described. Ground meat, which is generally soft and malleable, is pushed into the top opening 4 of the housing 3. Simultaneously, the crank handle 6 is turned, rotating the belts 8 in opposing directions. As the crank handle 6 is turned, the indentions 14 on the belts 8 align, forming spherical spaces between the outer surfaces of the belts 8. The ground meat is thus squeezed into the spherical spaces, becoming molded into a ball which is then communicated, by the rotation of the belts 8, through the outlet tube 5. The balls of meat thus formed are then placed into the meatball cooking device 11 described in detail below.

Figure 3:
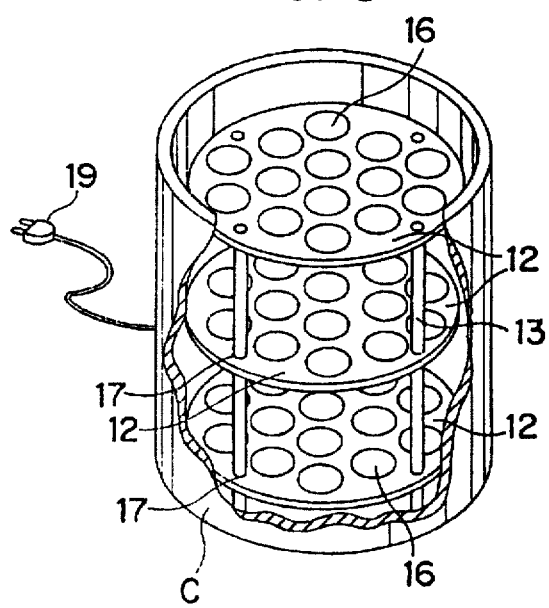
FIG. 3 shows a perspective view of the meatball cooking device of the present invention, with parts cut away to show the tray arrangement.

The meatball cooking device 11 of the present invention, shown in FIG. 3, comprises a plurality of cooking trays 12 and supporting members 13 positioned between the trays. The cooking trays 12 are planar and preferably circular in shape, as shown, though other shapes may be used without departing from the scope of the invention. As shown in FIG. 3, the circular shape facilitates placement of the cooking trays inside a slow cooker C, which is generally cylindrical. The cooking trays 12 each have a plurality of semi-spherical indentions 16 for the placement of meatballs and several peripheral mounting holes 17. Supporting members 13 have reduced end portions 18 which are received into the mounting holes 17, such that cooking trays 12 may be placed atop the supporting members 13 and held thereon. A number of cooking trays 12 may thus be superimposedly stacked, with the reduced end portions 18 being received into the mounting holes 17 of both upper and lower cooking trays 12.

The cooking trays 12 and support members 13 may be constructed from anodized aluminum or some other non-corrosive, high-heat metal material. It may also be desirable to construct the cooking trays 12 and support members 13 from microwave-safe plastic, so that the cooking device 11 can be used with microwave ovens.

The usefulness and advantages of the present invention should now be fully appreciated. The present invention provides a highly convenient, inexpensive, and easy to use apparatus for preparing meatballs. The meatball forming device 2 produces perfectly shaped meatballs with a simple turn of the crank handle 6. The cooking device 11 of the present invention may be used to cook a multitude of meatballs or other items simultaneously, providing convenience and increased energy efficiency. The cooking trays 12 are easily cleaned, being readily detachable for placement in a sink or dishwasher.

It should be noted that the number of trays 12 used with the cooker can be less than or more than the number shown, without departing from the scope of the invention. Also, the cooker is shown as being electrically operated by placing plug 19 into an electrical outlet, however, other means of heating the cooker can be employed without departing from the scope of the invention.

Although the meatball preparing apparatus and the method of using the same according to the present invention has been described in the foregoing specification with considerable details, it is to be understood that modifications may be made to the present invention which do not exceed the scope of the appended claims and modified forms of this invention done by others skilled in the art to which the invention pertains will be considered infringements of this invention when those modified forms fall within the claimed scope of the invention.

What I claim as my invention is:

1. An apparatus for forming and cooking meatballs comprising:

a housing having sides, a bottom and an open top, one of said sides having an output opening, and another side having a crank rotatably mounted therein, said crank being attached to a first roller mounted between two of said sides, a second roller vertically spaced from and mounted in alignment with said first roller, a first endless belt surrounding said first and second rollers, a third roller mounted adjacent said first roller, and a fourth roller vertically spaced from and mounted in alignment with said third roller, a second endless belt surrounding said third and fourth rollers, said belts having a plurality of semi-spherical indentations in an outer surface thereof, each of said belts also having a plurality of apertures extending therethrough, each of said rollers having a plurality of teeth extending therefrom, whereby when said crank is turned, said teeth on said rollers engage said apertures in said belts and rotate said belts.

2. The apparatus for forming and cooking meatballs as claimed in claim 1, wherein said open top is funnel shaped.

3. The apparatus for forming and cooking meatballs as claimed in claim 1, wherein said output opening is mounted below said belts.

4. The apparatus for forming and cooking meatballs as claimed in claim 1, wherein a cooker is provided to cook said meatballs after they are formed in said forming apparatus, wherein said cooker comprises:

a housing having a plurality of trays mounted therein, each of said trays being mounted in vertically spaced relationship to each other, each tray having a plurality of semi-spherical indentations therein, means for providing heat to said housing.

5. The apparatus for forming and cooking meatballs as claimed in claim 4, wherein said trays are held in spaced relationship by a plurality of posts positioned between said trays, each of said trays having a plurality of apertures therein, each of said posts having a reduced diameter end which engages one of said apertures on one tray, and each of said posts having a second reduced diameter end which engages one of said apertures on another tray.

* * * * *